*(12)* United States Patent
Wires et al.

(10) Patent No.: US 8,132,168 B2
(45) Date of Patent: Mar. 6, 2012

(54) SYSTEMS AND METHODS FOR OPTIMIZING A PROCESS OF DETERMINING A LOCATION OF DATA IDENTIFIED BY A VIRTUAL HARD DRIVE ADDRESS

(75) Inventors: Jacob Taylor Wires, Vancouver (CA); Andrew Kent Warfield, Vancouver (CA)

(73) Assignee: Citrix Systems, Inc., Fort Lauderdale, FL (US)

( * ) Notice: Subject to any disclaimer, the term of this patent is extended or adjusted under 35 U.S.C. 154(b) by 742 days.

(21) Appl. No.: 12/342,861

(22) Filed: Dec. 23, 2008

(65) Prior Publication Data

US 2010/0162239 A1 Jun. 24, 2010

(51) Int. Cl.
*G06F 7/00* (2006.01)
(52) U.S. Cl. ............ 718/1; 707/705; 707/821; 707/831
(58) Field of Classification Search ........................ None
See application file for complete search history.

(56) References Cited

U.S. PATENT DOCUMENTS

| | | | |
|---|---|---|---|
| 5,729,735 A * | 3/1998 | Meyering | 1/1 |
| 6,021,414 A * | 2/2000 | Fuller | 1/1 |
| 6,735,601 B1 * | 5/2004 | Subrahmanyam | 1/1 |
| 7,269,613 B2 * | 9/2007 | Sasaki et al. | 707/781 |
| 7,865,893 B1 * | 1/2011 | Omelyanchuk et al. | 718/1 |
| 2004/0210591 A1 * | 10/2004 | Hirschfeld et al. | 707/100 |
| 2006/0020779 A1 * | 1/2006 | Rothman et al. | 713/2 |
| 2007/0136551 A1 * | 6/2007 | Leis et al. | 711/173 |
| 2008/0005195 A1 * | 1/2008 | Li | 707/203 |
| 2008/0178290 A1 * | 7/2008 | Besch et al. | 726/22 |
| 2009/0260007 A1 * | 10/2009 | Beaty et al. | 718/1 |
| 2009/0328035 A1 * | 12/2009 | Ganguly | 718/1 |

\* cited by examiner

*Primary Examiner* — Idriss N Alrobaye
(74) *Attorney, Agent, or Firm* — Foley and Lardner LLP; John D. Lanza

(57) ABSTRACT

A system for optimizing a process of determining a location of data identified by a virtual hard drive address includes a virtual hard drive, a hypervisor, a plurality of chained files and a table. The plurality of chained files includes a first file comprising a delta of a master file and each subsequent file comprising a delta of a previous file in the plurality of chained files. The table enumerates associations between each of a plurality of virtual hard drive addresses with one of the master file and a file in the plurality of chained files. The virtual hard drive stores the master file, the plurality of chained files, and the table. The hypervisor intercepts a request to access data at a virtual hard drive address and identifies, based on the table, a file containing the requested data and responds to the request with access to the requested data.

12 Claims, 6 Drawing Sheets

SYSTEMS AND METHODS FOR OPTIMIZING A PROCESS OF DETERMINING A LOCATION OF DATA IDENTIFIED BY A VIRTUAL HARD DRIVE ADDRESS

FIELD OF THE DISCLOSURE

This disclosure generally relates to systems and methods for optimizing virtual machine execution. In particular, this disclosure relates to systems and methods for optimizing a process of determining a location of data identified by a virtual hard drive address.

BACKGROUND OF THE DISCLOSURE

In conventional computing environments implementing a hypervisor to execute a virtual machine on a host computing device, the hypervisor typically provides the virtual machine with access to virtual resources, including a virtual disk. In typical environments, when a modification is made to the virtual disk, a new image may be made of the virtual disk image; for example, a copy-on-write approach may result in a chain of virtual disk images in which the master file and modified versions of the master file are generated, a new modification to the image resulting in a new, "child" image associated with the older files. In these environments, a request from the virtual machine to read to or write from a virtual disk may be routed to the child image. Read requests, however, may require additional routing as the child image is typically queried first to determine whether it contains the requested data; if the child image does not contain the requested data, the request is then re-routed to the parent file, whose metadata is also checked; this process recurses up the chain to the master file until the data is located. Thus, processing read requests in conventional copy-on-write environments incur an additional delay and processing burdens that increase with the number of child images.

BRIEF SUMMARY OF THE DISCLOSURE

In one aspect, a method for optimizing a process of determining a location of data identified by a virtual hard drive address includes storing, by a virtual hard drive stored on a physical computing device, a master file and a plurality of chained files, a first file in the plurality of chained files comprising a delta of the master file and each subsequent file comprising a delta of a previous file in the plurality of chained files. The method includes maintaining a table associating each of a plurality of virtual hard drive addresses with a file in the plurality of chained files containing a current version of data stored at one of the plurality of virtual hard drive addresses. The method includes intercepting a request to access data at a virtual hard drive address. The method includes identifying, based on the table, a file containing the addressed data. The method includes providing, in response to the intercepted request, access to the addressed data from the identified file.

In one embodiment, the method includes determining that a current version of requested data is not stored in a final file in the plurality of chained files and identifying, responsive to the determination, and based on the table, a file in the plurality of chained files containing the current version of the data. In another embodiment, the method includes maintaining a table associating each of a plurality of virtual hard drive addresses to a master file or a file in the plurality of chained files containing a current version of data at that address, and associating each of a second plurality of virtual hard drive addresses to at least one file that is not a master file or a file in the plurality of chained files; the at least one file may be comprise one or more blocks duplicated across the virtual hard drive.

In another aspect, a system for optimizing a process of determining a location of data identified by a virtual hard drive address includes a virtual hard drive, a hypervisor, a plurality of chained files and a table. The plurality of chained files includes a first file in the plurality of chained files comprising a delta of a master file and each subsequent file comprising a delta of a previous file in the plurality of chained files. The table enumerates associations between each of a plurality of virtual hard drive addresses with one of the master file and a file in the plurality of chained files containing a current version of data stored at one of the plurality of virtual hard drive addresses. The virtual hard drive, stored on a physical computing device, stores the master file, the plurality of chained files, and the table. The hypervisor, in communication with the virtual hard drive, intercepts a request to access data at a virtual hard drive address, identifies, based on the table, a file containing the requested data and responds to the request with access to the requested data.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
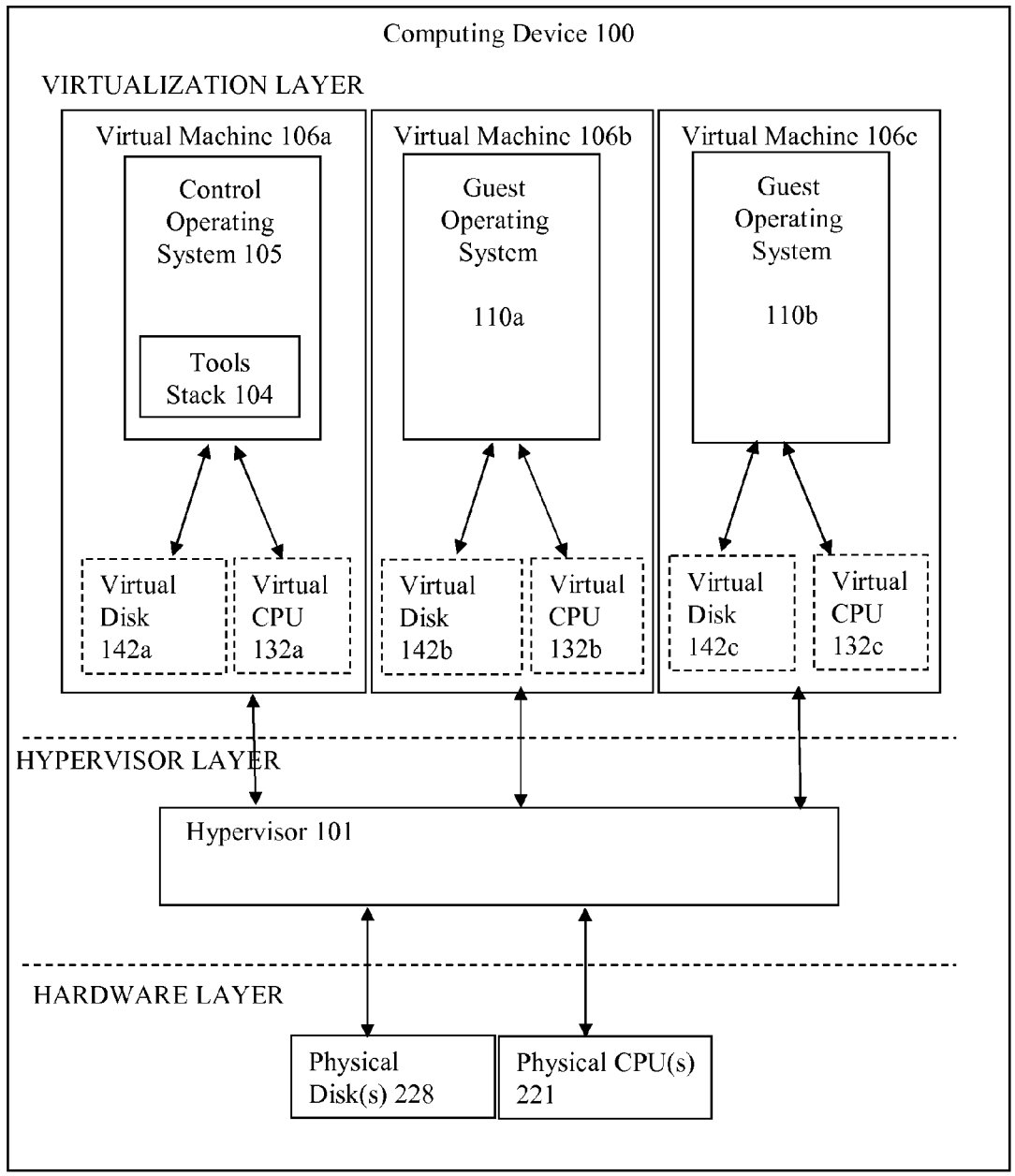
FIG. 1A is a block diagram depicting an embodiment of a computing environment comprising a hypervisor layer, a virtualization layer, and a hardware layer.

Referring now to FIG. 1A, a block diagram depicts one embodiment of a virtualization environment. In brief overview, a computing device 100 includes a hypervisor layer, a virtualization layer, and a hardware layer. The hypervisor layer includes a hypervisor 101 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 110 and a plurality of virtual resources allocated to the at least one operating system 110, which may include a plurality of virtual processors 132a, 132b, 132c (generally 132), and/or virtual disks 142a, 142b, 142c (generally 142). The plurality of virtual resources and the operating system 110 may be referred to as a virtual machine 106. A virtual machine 106 may include a control operating system 105 in communication with the hypervisor 101 and used to execute applications for managing and configuring other virtual machines on the computing device 100.

Referring now to FIG. 1A, and in greater detail, a hypervisor 101 may provide virtual resources to an operating system in any manner which simulates the operating system having access to a physical device. A hypervisor 101 may provide virtual resources to any number of guest operating systems 110a, 110b (generally 110). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor which creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 101 executes within an operating system executing on a computing device. In one of these embodiments, a computing device executing an operating system and a hypervisor 101 may be said to have a host operating system (the operating system executing on the computing device), and a guest operating system (an operating system executing within a computing resource partition provided by the hypervisor 101). In other embodiments, a hypervisor 101 interacts directly with hardware on a computing device, instead of executing on a host operating system. In one of these embodiments, the hypervisor 101 may be said to be executing on "bare metal," referring to the hardware comprising the computing device.

In some embodiments, a hypervisor 101 may create a virtual machine 106a-c (generally 106) in which an operating system 110 executes. In one of these embodiments, for example, the hypervisor 101 loads a virtual machine image to create a virtual machine 106. In another of these embodiments, the hypervisor 101 executes an operating system 110 within the virtual machine 106. In still another of these embodiments, the virtual machine 106 executes an operating system 110.

In some embodiments, the hypervisor 101 controls processor scheduling and memory partitioning for a virtual machine 106 executing on the computing device 100. In one of these embodiments, the hypervisor 101 controls the execution of at least one virtual machine 106. In another of these embodiments, the hypervisor 101 presents at least one virtual machine 106 with an abstraction of at least one hardware resource provided by the computing device 100. In other embodiments, the hypervisor 101 controls whether and how physical processor capabilities are presented to the virtual machine 106.

A control operating system 105 may execute at least one application for managing and configuring the guest operating systems. In one embodiment, the control operating system 105 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 101 executes the control operating system 105 within a virtual machine 106 created by the hypervisor 101. In still another embodiment, the control operating system 105 executes in a virtual machine 106 that is authorized to directly access physical resources on the computing device 100. In some embodiments, a control operating system 105a on a computing device 100a may exchange data with a control operating system 105b on a computing device 100b, via communications between a hypervisor 101a and a hypervisor 101b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 105 executes in a virtual machine 106 that is authorized to interact with at least one guest operating system 110. In another embodiment, a guest operating system 110 communicates with the control operating system 105 via the hypervisor 101 in order to request access to a disk or a network. In still another embodiment, the guest operating system 110 and the control operating system 105 may communicate via a communication channel established by the hypervisor 101, such as, for example, via a plurality of shared memory pages made available by the hypervisor 101.

In some embodiments, the control operating system 105 includes a network back-end driver for communicating directly with networking hardware provided by the computing device 100. In one of these embodiments, the network back-end driver processes at least one virtual machine request from at least one guest operating system 110. In other embodiments, the control operating system 105 includes a block back-end driver for communicating with a storage element on the computing device 100. In one of these embodiments, the block back-end driver reads and writes data from the storage element based upon at least one request received from a guest operating system 110.

In one embodiment, the control operating system 105 includes a tools stack 104. In another embodiment, a tools stack 104 provides functionality for interacting with the hypervisor 101, communicating with other control operating systems 105 (for example, on a second computing device 100b), or managing virtual machines 106b, 106c on the computing device 100. In another embodiment, the tools stack 104 includes customized applications for providing improved management functionality to an administrator of a virtual machine farm. In some embodiments, at least one of the tools stack 104 and the control operating system 105 include a management API that provides an interface for remotely configuring and controlling virtual machines 106 running on a computing device 100. In other embodiments, the control operating system 105 communicates with the hypervisor 101 through the tools stack 104.

In one embodiment, the hypervisor 101 executes a guest operating system 110 within a virtual machine 106 created by the hypervisor 101. In another embodiment, the guest operating system 110 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 110, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 101; in such an embodiment, the driver is typically aware that it executes within a virtualized environment.

Figure 1B:
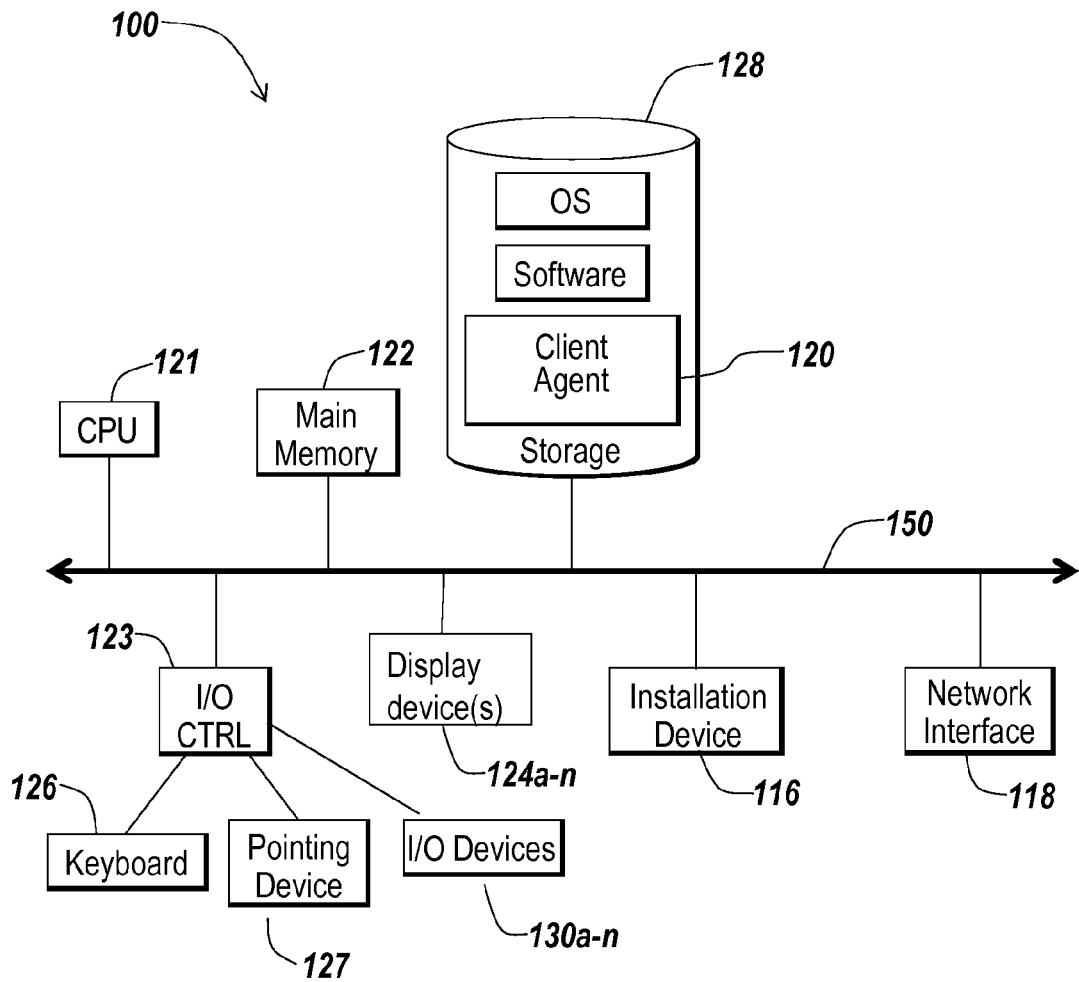
FIGS. 1B and 1C are block diagrams depicting embodiments of computing devices useful in connection with the methods and systems described herein.
Figure 1C:
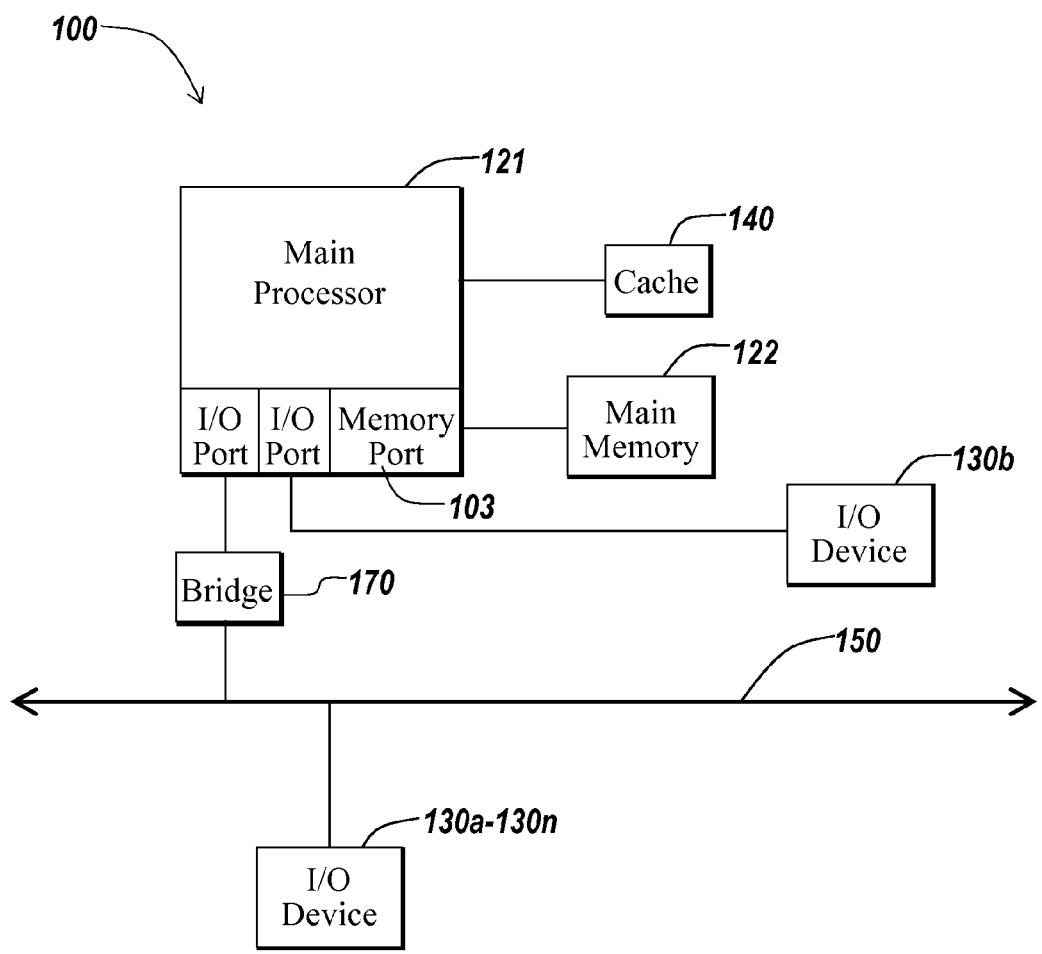

In another embodiment, the guest operating system 110, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 105, as described above The computing device 100 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of methods and systems described herein. As shown in FIGS. 1B and 1C, a computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In some embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output DRAM (EDO DRAM), Burst Extended Data Output DRAM (BEDO DRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with a display device 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc., of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the ZEN VISION W, the ZEN VISION series, the ZEN PORTABLE MEDIA CENTER devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 includes a combination of devices, such as a mobile phone combined with a digital audio player or portable media player. In one of these embodiments, the computing device 100 is a smartphone, for example, an iPhone manufactured by Apple Computer, or a Blackberry device, manufactured by Research In Motion Limited. In yet another embodiment, the computing device 100 is a laptop or desktop computer equipped with a web browser and a microphone and speaker system, such as a telephony headset. In these embodiments, the computing devices 100 are web-enabled and can receive and initiate phone calls. In other embodiments, the communications device 100 is a Motorola RAZR or Motorola ROKR line of combination digital audio players and mobile phones.

A computing device 100 may be a file server, application server, web server, proxy server, appliance, network appliance, gateway, application gateway, gateway server, virtualization server, deployment server, SSL VPN server, or firewall. In some embodiments, a computing device 100 provides a remote authentication dial-in user service, and is referred to as a RADIUS server. In other embodiments, a computing device 100 may have the capacity to function as either an application server or as a master application server. In still other embodiments, a computing device 100 is a blade server.

In one embodiment, a computing device 100 may include an Active Directory. The computing device 100 may be an application acceleration appliance. For embodiments in which the computing device 100 is an application acceleration appliance, the computing device 100 may provide functionality including firewall functionality, application firewall functionality, or load balancing functionality. In some embodiments, the computing device 100 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In other embodiments, a computing device 100 may be referred to as a client node, a client machine, an endpoint node, or an endpoint. In some embodiments, a client 100 has the capacity to function as both a client node seeking access to resources provided by a server and as a server node providing access to hosted resources for other clients.

In some embodiments, a first, client computing device 100a communicates with a second, server computing device 100b. In one embodiment, the client communicates with one of the computing devices 100 in a server farm. Over the network, the client can, for example, request execution of various applications hosted by the computing devices 100 in the server farm and receive output data of the results of the application execution for display. In one embodiment, the client executes a program neighborhood application to communicate with a computing device 100 in a server farm.

A computing device 100 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 100. In some embodiments, the application may be a server-based or a remote-based application executed on behalf of a user of a first computing device by a second computing device. In other embodiments, the second computing device may display output data to the first, client computing device using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

Figure 2A:
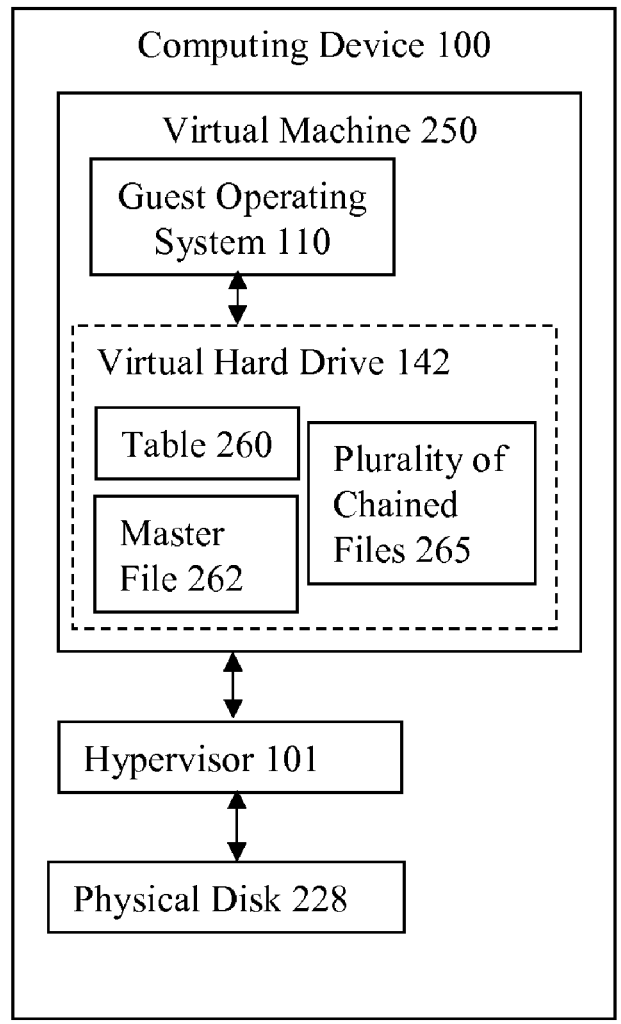
FIG. 2A is a block diagram depicting an embodiment of a system for optimizing a process of determining a location of data identified by a virtual hard drive address.

Referring now to FIG. 2A, a block diagram depicts one embodiment of a system for optimizing a process of determining a location of data identified by a virtual hard drive address. In brief overview, the system includes a virtual hard drive 142, a hypervisor 101, a table 260, and a plurality of chained files 265. The plurality of chained files 265 includes a first file comprising a delta of a master file 262 and each subsequent file comprising a delta of a previous file in the plurality of chained files 265. The table 260 enumerates associations between each of a plurality of virtual hard drive addresses with one of the master file 262 and a file in the plurality of chained files 265 containing a current version of data stored at one of the plurality of virtual hard drive addresses. The virtual hard drive 142, stored on a physical computing device 100, stores the master file 262, the plurality of chained files 265, and the table 260. The hypervisor 101, in communication with the virtual hard drive 142, intercepts a request to access data at a virtual hard drive address, identifies, based on the table 260, a file containing the requested data and responds to the request with access to the requested data.

Referring now to FIG. 2A, and in greater detail, the plurality of chained files 265 includes a first file comprising a delta of a master file 262 and each subsequent file comprising a delta of a previous file in the plurality of chained files 265. In one embodiment, the plurality of chained files 265 is a chain of copy-on-write virtual disk images. In another embodiment, each file in the chain contains a mapping from a virtual disk address to a file offset. In still another embodiment, a file in the chain is associated with metadata that tracks which regions of the file contain valid data. In some embodiments, a process executing within the virtual machine may write to the final file in the plurality of chained files 265.

In some embodiments, a file in the plurality of chained files 265 stores an image. In one of these embodiments, the file is a virtual machine image. In another of these embodiments, the file is an operating system image. In other embodiments, the file in the plurality of chained files 265 does not store executable data. In one of these embodiments, the file is a database.

Figure 2B:
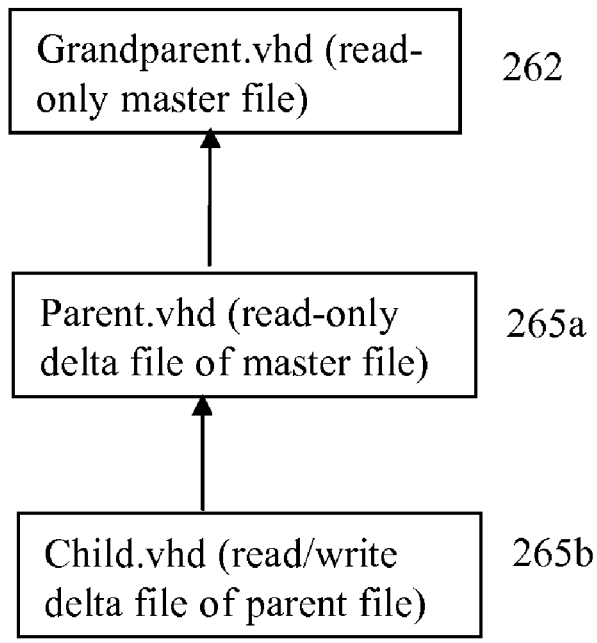
FIG. 2B is a block diagram depicting one embodiment of a plurality of chained files.

Referring ahead to FIG. 2B, a block diagram depicts one embodiment of a plurality of chained files 265. As shown in FIG. 2B, a master file 262 is the first file in the plurality of chained files 265. In one embodiment, the master file 262 may be referred to as a grandparent file. In some embodiments, the master file 262 is a read-only master file. A delta file reflecting a modification to the master file 262 is a second file 265a in the plurality of chained files 265. As shown in FIG. 2B, and in some embodiments, a delta file 265b reflecting a modification to the delta file 265a is referred to as a child file 265b while the delta file 265a is referred to as a parent file 265a.

In one embodiment, a process accessing a child file 265b in the plurality of chained files has the ability to read and to write to the file. In another embodiment, a process accessing a parent file 265a in the plurality of chained files has only the ability to read a file. For example, and in still another embodiment, a file 265a may allow both read and write access until a new delta file 265b is created; at which time the file 265 may allow only read access. In some embodiments, the final file in the plurality of chained files 265 is writeable by a process executing within a virtual machine 250.

Referring back to FIG. 2A, a table 260 enumerates associations between each of a plurality of virtual hard drive addresses with one of the master file 262 and a file in the plurality of chained files 265 containing a current version of data stored at one of the plurality of virtual hard drive addresses. In some embodiments, the table 260 is referred to as a file descriptor table.

In one embodiment, the table 260 has a data structure that stores a file identifier (a file ID), a file path, a file access, and a virtual hard drive file universally unique identifier (UUID). In another embodiment, each row in the table 260 represents a file in the plurality of chained files 265. In some embodiments, one file descriptor table 260 stores data associated with each file in the plurality of chained files 265. In other embodiments, multiple tables 260 are provided for a plurality of chained files. In further embodiments, the table 260 may include a header identifying at least one field used to validate consistency of the table 260 and to locate files and tables associated with the table 260. In one of these embodiments, the UUID and the timestamp fields also provide data which can be used in confirming consistency of the data within the table 260.

In one embodiment, the file ID in the table 260 specifies a unique identifier of a file in the plurality of chained files 265. In another embodiment, the file path in the table 260 specifies a location of the file in the file system provided by the virtual hard drive 142. In still another embodiment, the file access time in the table 260 specifies a time at which the file having the indicated file ID was modified by a process on the computing device 100; for example, a process executing within a virtual machine 250 associated with the virtual hard drive 142. In yet another embodiment, the virtual hard drive address in the table 260 is a unique identifier embedded in the virtual hard drive metadata and specifying.

In some embodiments, a second table is provided, specifying the file ID from the table 260 as well as an offset identifying a sector of the virtual hard drive. A sector of a virtual hard drive may be, for example 512 bytes of data stored by the virtual hard drive. In one of these embodiments, the offset identifies a section of the virtual hard drive storing the data in the identified file. In another of these embodiments, the second table is referred to as a block descriptor table. In still another of these embodiments, the block descriptor table is organized into a plurality of logical blocks, each of which represents a region of the virtual hard drive 142; for example, a logical block in the plurality of logical blocks may represent a contiguous 2 MB region of the virtual hard drive 142. In yet another of these embodiments, a block descriptor table is generated for each file in the plurality of chained files 265. In other embodiments, one block descriptor table stores data associated with each file in the plurality of chained files. In further embodiments, a plurality of block descriptor table is associated with a plurality of chained files 265.

In some embodiments, two tables are provided: a table 260 and a block descriptor table. In one of these embodiments, providing the second table results in storage of a file identifier for each block in a block descriptor table, rather than a full pathname for a file, which may result in reduced size of the table 260. In another of these embodiments, the table 260 provides an improved ability to add or remove or otherwise modify an entry to the table 260.

In other embodiments, a third table is provided, identifying at least one range of virtual hard drive addresses. In one of these embodiments, the third table is an array mapping a range of virtual hard drive addresses into an offset specified by the second table. In another of these embodiments, for example, the array maps a 2 MB region of virtual sector addresses into offsets identified by a block descriptor table. In still another of these embodiments, the third table is referred to as a block allocation table. In yet another of these embodiments, and for example, each row of a block allocation table points to a byte offset identified in a block descriptor table for a 2 MB region of data. In some embodiments, one block allocation table stores data associated with each file in the plurality of chained files. In further embodiments, a plurality of block allocation tables is associated with a plurality of chained files 265.

The following is an example of one embodiment of the table 260:

| File ID | File Path | Time | VHD UUID |
|---------|-----------|------|----------|
| 1 | /root/grandparent.vhd | 12:30 | <uuid> |
| 2 | /root/parent.vhd | 02:15 | <uuid> |

The following is an example of one embodiment of a block descriptor table associated with the above example of the table 260:

| Block Descriptor Table: | | |
|---|---|---|
| File ID | Offset in VHD file | |
| (First block:) | | |
| 1 | 0x2200 | (byte offset 0x00000 in block descriptor table) |
| 1 | 0x2400 | (byte offset 0x00008 in block descriptor table) |
| NULL | NULL | (byte offset 0x00010 in block descriptor table) |
| ... | | |
| (second block:) | | |
| 1 | 0x4000 | (byte offset 0x08000 in block descriptor table) |
| 2 | 0x7200 | (byte offset 0x08008 in block descriptor table) |
| 2 | 0x7400 | (byte offset 0x08010 in block descriptor table) |
| ... | | |
| (third block:) | | |
| 2 | 0x8400 | (byte offset 0x10000 in block descriptor table) |
| 2 | 0x8600 | (byte offset 0x10008 in block descriptor table) |
| 2 | 0x8800 | (byte offset 0x10010 in block descriptor table) |
| ... | | |
| (fourth block:) | | |
| 2 | 0x0000 | (byte offset 0x18000 in block descriptor table) |
| 2 | 0x0200 | (byte offset 0x18008 in block descriptor table) |

| Block Descriptor Table: | | |
|---|---|---|
| File ID | Offset in VHD file | |
| 2 | 0x0400 | (byte offset 0x18010 in block descriptor table) |

The following is an example of one embodiment of a block allocation table associated with the above examples of the table 260 and of the block descriptor table:

Block Allocation Table for Grandparent File in the Plurality of Chained Files 265:

| | |
|---|---|
| 0x00000 | (logical block 0) |
| 0x08000 | (logical block 1) |
| NULL | (logical block 2) |
| NULL | (logical block 3) |

Block Allocation Table for Parent File in the Plurality of Chained Files 265:

| | |
|---|---|
| 0x00000 | (logical block 0) |
| 0x08000 | (logical block 1) |
| 0x10000 | (logical block 2) |
| 0x18000 | (logical block 3) |

In the examples above, NULL regions in the block allocation table and the block descriptor table indicate that no valid data has been written to the corresponding logical sector addresses; zeros are returned in these examples. In one embodiment, a NULL region in a block allocation table need not be represented by the block descriptor table, which may conserve resources. In another embodiment, a copy of the file descriptor table 260 is stored in a cache. In still another embodiment, a copy of the block allocation table is stored in a cache. In still even another embodiment, a copy of the block allocation table for a first file in the plurality of chained files is stored in a cache. In yet another embodiment, a set of least recently used data blocks in the block descriptor table are stored in random-access memory (RAM) on the computing device 100.

In some embodiments, use of the table 260 and any associated tables provided results in an optimized process for identifying a file storing a current (most-recently modified) version of a file.

In one embodiment, a file descriptor table 260 and a block descriptor table are shared across the entire plurality of chained files, while each block allocation table is specific to its corresponding file; this allows the index to serve multiple active virtual hard drives simultaneously. In another embodiment, the use of separate files for the block descriptor table and the block allocation tables also allow for the modification of the table 260 without invalidating entries for previous files; in this embodiment, the table 260 itself is modified in a copy-on-write manner. In another embodiment, by continuing to use older block allocation tables, the table 260 can be updated in the background.

The virtual hard drive 142, stored on a physical computing device 100, stores the master file 262, the plurality of chained files 265, and the table 260. In one embodiment, a hypervisor 101 provides the virtual hard drive 142. In other embodiments, the hypervisor 101 provisions the virtual hard drive 142 as part of a process of initializing and executing a virtual machine 250.

In one embodiment, the hypervisor 101, in communication with the virtual hard drive 142, intercepts a request to access data at a virtual hard drive address, identifies, based on the table 260, a file containing the requested data and responds to the request with access to the requested data. In another embodiment, the hypervisor 101 includes a component intercepting a request to access data at a virtual hard drive address and identifying, based on the table 260, a file containing the requested data. In some embodiments, the hypervisor 101 includes interception and translation functionality allowing the hypervisor 101 to intercept access requests from the virtual machine to the physical disk, and to translate an address included in the request into an address format that the physical disk is capable of processing. In one of these embodiments, the interception and translation functionality is modified to include functionality allowing the hypervisor to intercept a request to access data at a virtual hard drive address, identify, based on the table 260, a file containing the requested data and respond to the request with access to the requested data. In another of these embodiments, the interception and translation functionality is referred to as a block tap module.

In one embodiment, a utility is provided that generates the table 260. In another embodiment, the utility provides functionality for adding an entry to the table 260. In still another embodiment, the utility provides functionality for updating an entry in the table 260. In still even another embodiment, the utility provides functionality for displaying, to a user, a table 260. In yet another embodiment, the utility stores a generated or modified table; for example, the utility may store the table 260 in the virtual disk 142. In some embodiments, the utility provides the hypervisor 101 with functionality for updating an entry in the table by associating a file in the plurality of chained files 265 with a virtual hard drive address when a new file is added to the plurality of chained files 265.

In some embodiments, a virtual machine 250 includes the utility for generating and maintaining a table 260. In other embodiments, the utility is installed on the computing device 100 as one of a plurality of disk management tools. In still other embodiments, a user specifies whether or not the virtual hard drive should access the table 260. In still even other embodiments, the control operating system 105, in communication with the hypervisor 101, executes the utility. In yet other embodiments, the utility is a command-line utility. In further embodiments, the utility provides a graphical user interface.

Figure 3:
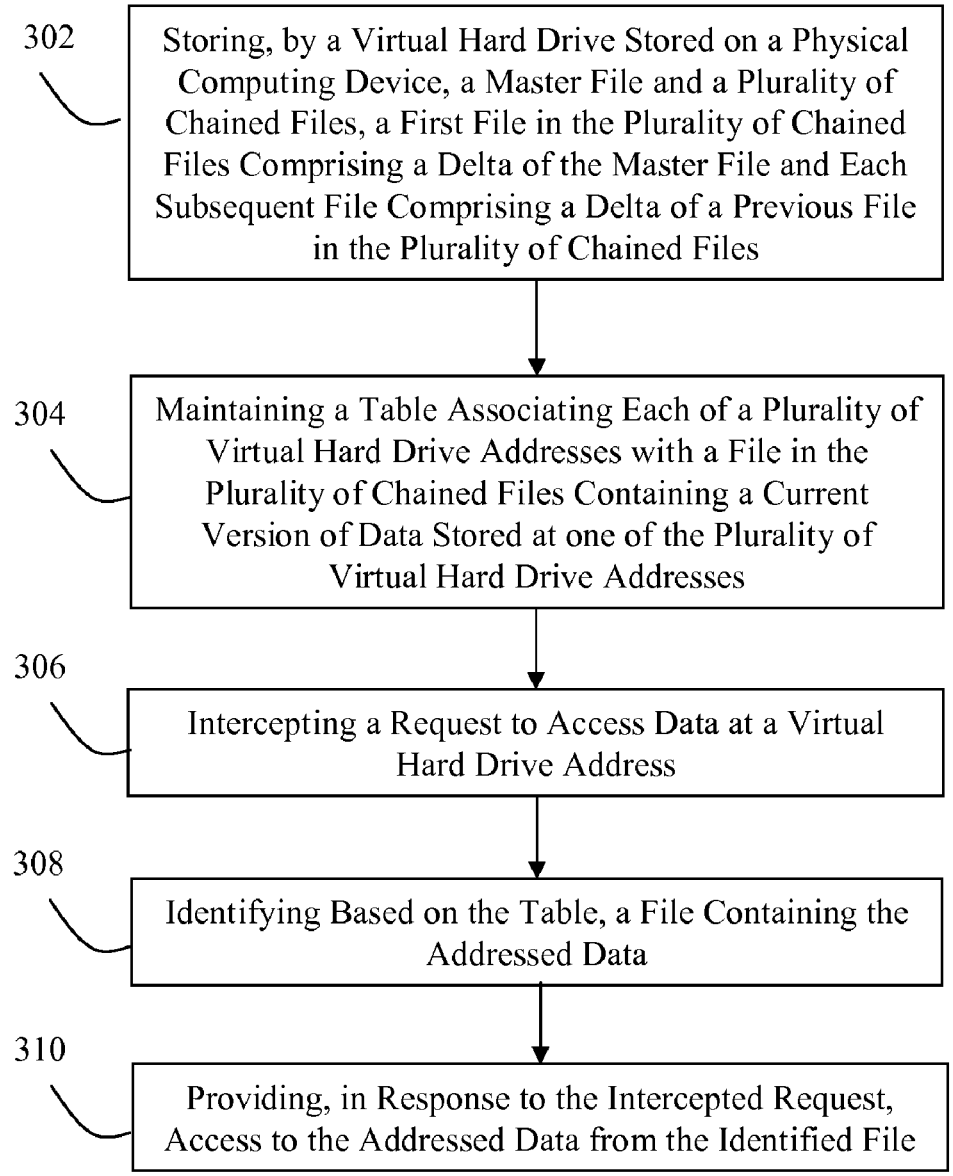
FIG. 3 is a flow diagram depicting an embodiment of a method for optimizing a process of determining a location of data identified by a virtual hard drive address.

Referring now to FIG. 3, a flow diagram depicts one embodiment of a method for optimizing a process of determining a location of data identified by a virtual hard drive address. In brief overview, the method includes storing, by a virtual hard drive stored on a physical computing device, a master file and a plurality of chained files, a first file in the plurality of chained files comprising a delta of the master file and each subsequent file comprising a delta of a previous file in the plurality of chained files (302). The method includes maintaining a table associating each of a plurality of virtual hard drive addresses with a file in the plurality of chained files containing a current version of data stored at one of the plurality of virtual hard drive addresses (304). The method includes intercepting a request to access data at a virtual hard drive address (306). The method includes identifying, based on the table, a file containing a current version of the requested data (308). The method includes providing, in response to the intercepted request, access to the addressed data from the identified file (310). In some embodiments, a computer readable medium is provided having instructions thereon that when executed provide for optimizing a process of determining a location of data identified by a virtual hard drive address.

Referring now to FIG. 3, and in greater detail, a virtual hard drive stored on a physical computing device stores a master file and a plurality of chained files, a first file in the plurality of chained files comprising a delta of the master file and each subsequent file comprising a delta of a previous file in the plurality of chained files (302). A table associating each of a plurality of virtual hard drive addresses with a file in the plurality of chained files containing a current version of data stored at one of the plurality of virtual hard drive addresses is maintained (304). In one embodiment, the table is a file description table 260 as described above. In another embodiment, the table 260 is referred to as an index. In still another embodiment, a utility component generates and maintains the table 260. In some embodiments, the table 260 associates a virtual hard drive address to a file that is neither the master file nor a file in the plurality of chained files 265. In one of these embodiments, the virtual hard drive address is associated with at least one block that has been duplicated across at least one virtual hard drive.

In one embodiment, an update to the table 260 occurs when a new file is added to the plurality of chained files 265. In another embodiment, when the new file is created, authorization to modify the file that was previously the final file in the plurality of chained files 265 is changed so that the file becomes a read-only file, while the new file is modified to allow read-write access. In still another embodiment, metadata associated with the new file is used to create an entry into a block descriptor table for at least one region of the file that contains data. In still even another embodiment, a new entry is added to the table 260 representing the file. In yet another embodiment, a block allocation table is created for the new file. In some embodiments, an entry in the table 260 is updated by associating a file in the plurality of chained files 265 with a virtual hard drive address. In other embodiments, the utility described above in connection with FIG. 2A updates the table 260.

The following is an example of one embodiment of the steps taken to update the table 260. In one embodiment, the utility would generate a new file descriptor table, for example:

| File ID | File Path | Time | VHD UUID |
|---|---|---|---|
| 1 | /root/grandparent.vhd | 12:30 | <uuid> |
| 2 | /root/parent.vhd | 02:15 | <uuid> |
| 3 | /root/child.vhd | 06:44 | <uuid> |

In another embodiment, the block allocation table for child.vhd is created, for example, by cloning the block allocation table for parent.vhd and overwriting at least one row in the cloned table which correspond to at least one region in the child.vhd that contains valid data:

| | |
|---|---|
| 0x20000 | (logical block 0) |
| 0x08000 | (logical block 1) |
| 0x10000 | (logical block 2) |
| 0x18000 | (logical block 3) |

In still another embodiment, a new block is appended to the block descriptor table describing logical block 0 of child.vhd:

| | | (fifth block of Block Descriptor Table) |
|---|---|---|
| 3 | 0x0000 | (byte offset 0x20000 in block descriptor table) |
| 3 | 0x0200 | (byte offset 0x20008 in block descriptor table) |
| 3 | 0x0400 | (byte offset 0x20010 in block descriptor table) |

A request to access data at a virtual drive address is intercepted (306). In one embodiment, the hypervisor 101 intercepts the request to access data. In another embodiment, the hypervisor 101 intercepts a request from the virtual machine for access to data stored by the physical disk 228.

In some embodiments, a request to write a file is intercepted. In one of these embodiments, the request is redirected to a final file in the plurality of chained files. In other embodiments, the request is an input/output request from a process executing in a virtual machine which includes the virtual hard drive 142. In still other embodiments, a request to copy, open, read, or otherwise access the data of a file without modification of the original file is intercepted. In one of these embodiments, the table 260 is accessed to determine whether the final file in the plurality of chained files 265 stores a current (most-recently updated) version of the file, or whether another file in the plurality of chained files 265 stores the data.

A file containing a current version of the requested data is identified, based on the table (308). In one embodiment, the hypervisor 101 identifies the file containing the data. In another embodiment, the hypervisor 101 includes a component that accesses the table 260 to identify which file in the plurality of chained files 265 stores the requested data. In some embodiments, the hypervisor 101 determines that a current version of requested data is not stored in a final file in the plurality of chained files 265. In one of these embodiments, the hypervisor 101 identifies, based on the table 260 and responsive to the determination, a file in the plurality of chained files 265 containing the current version of the data.

In response to the intercepted request, access is provided to the addressed data from the identified file (310). In some embodiments, the virtual hard drive 142 maintains a plurality of open files, keeping the files available for access by a guest operating system 110 so as to minimize an amount of time required to provide the access. In other embodiments, the component on the hypervisor 101 requests access to the file on behalf of the virtual machine based on a result of searching the table 260 for addressed data.

In one embodiment, and by way of example, to find a file storing data, the hypervisor 101 identifies the location of a sector (for example "sector 1") of a file in the plurality of chained files 265, which, in this example, forms the virtual hard drive 142. In another embodiment, the hypervisor 101 evaluates the file child.vhd (the final file in the plurality of chained files 265) to determine whether it contains valid data for sector 1 and, if it does, the value of the data is returned. In still another embodiment, however, the child.vhd file does not contain valid data. In this embodiment, the hypervisor 101 identifies the index for the parent.vhd file (a file preceding the child.vhd file in the plurality of chained files 265) in a block allocation table corresponding to sector 1. In still even another embodiment, the hypervisor 101 determines the offset from the parent.vhd block allocation table entry 0, which points to the 2 MB block of the Block Descriptor Table containing the mapping of sector 1 for file parent.vhd (in the example, byte offset 0x00). In still another embodiment, the hypervisor 101 reads the file identifier and the offset from the block descriptor table and reads the file path from the file descriptor table corresponding to the file identifier extracted from the block descriptor table. In the example tables shown above, the resulting path would be a path to a file (/root/grandparent.vhd) and an offset in that file (0x2400) where the requested data is located. In yet another embodiment, by accessing the table 260 to identify the file storing the most current version of the requested data, the hypervisor performs a single look-up rather than n number of lookups, where n is the number of files in the plurality of chained files 265; this results in a more efficient, optimized file identification process.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for optimizing a process of determining a location of data identified by a virtual hard drive address, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for optimizing a process of determining a location of data identified by a virtual hard drive address, the method comprising:

storing, by a virtual hard drive stored on a physical computing device, a master file and a plurality of chained files, a first file in the plurality of chained files comprising a delta of the master file and each subsequent file comprising a delta of a previous file in the plurality of chained files;

maintaining a table associating each of a plurality of virtual hard drive addresses with a file in the plurality of chained files containing a current version of data stored at one of the plurality of virtual hard drive addresses;

intercepting a request to access data at a virtual hard drive address;

identifying, based on the table, a file containing the addressed data;

providing, in response to the intercepted request, access to the addressed data from the identified file;

determining that a current version of the requested data is not stored in a most recent delta file of the plurality of chained files; and responsive to the determination and based on the table, identifying a file in the plurality of chained files containing the current version of the requested data.

2. The method of claim 1 further comprising updating an entry in the table by associating a file in the plurality of chained files with a virtual hard drive address when a new file is added to the plurality of chained files.

3. The method of claim 1 wherein maintaining further comprises maintaining a table associating each of a plurality of virtual hard drive addresses to a master file or a file in the plurality of chained files containing a current version of data at that address, and associating each of a second plurality of virtual hard drive addresses to at least one file that is not a master file or a file in the plurality of chained files.

4. The method of claim 3, wherein the at least one file comprises one or more blocks duplicated across at least one virtual hard drive.

5. A system for optimizing a process of determining a location of data identified by a virtual hard drive address, the system comprising:
- a plurality of chained files, a first file in the plurality of chained files comprising a delta of a master file and each subsequent file comprising a delta of a previous file in the plurality of chained files;
- a table associating each of a plurality of virtual hard drive addresses with one of the master file and a file in the plurality of chained files containing a current version of data stored at one of the plurality of virtual hard drive addresses;
- a virtual hard drive stored on a physical computing device, the virtual hard drive storing the master file, the plurality of chained files, and the table; and
- a hypervisor, in communication with the virtual hard drive, the hypervisor configured to:
- intercept a request to access data at a virtual hard drive address,
- identify, based on the table, a file containing the requested data and responding to the request with access to the requested data
- determine that a current version of the requested data is not stored in a most recent delta file, and
- identify, responsive to the determination and based on the table, a file in the plurality of chained files containing the current version of the data.

6. The system of claim 5 further comprising a final file in the plurality of chained files that is writeable by a process executing within a virtual machine including the virtual hard drive.

7. The system of claim 5, wherein the hypervisor updates an entry in the table by associating a file in the plurality of chained files with a virtual hard drive address when a new file is added to the plurality of chained files.

8. The system of claim 5, wherein the table further comprises an association between a second plurality of virtual hard drive addresses and at least one file that is not a master file or a delta file.

9. The system of claim 8, wherein the at least one file comprises one or more blocks duplicated across at least one virtual hard drive.

10. A non-transitory computer readable medium having instructions thereon that when executed provide a method for optimizing a process of determining a location of data identified by a virtual hard drive address, the computer readable media comprising:
- instructions to store, by a virtual hard drive stored on a physical computing device, a master file and a plurality of chained files, a first file in the plurality of chained files comprising a delta of the master file and each subsequent file comprising a delta of a previous file in the plurality of chained files;
- instructions to maintain a table associating each of a plurality of virtual hard drive addresses with a file in the plurality of chained files containing a current version of data stored at one of the plurality of virtual hard drive addresses;
- instructions to intercept a request to access data at a virtual hard drive address; instructions to identify, based on the table, a file containing the addressed data;
- instructions to provide, in response to the intercepted request, access to the addressed data from the identified file
- instructions to determine that a current version of the requested data is not stored in a most recent delta file of the plurality of chained files; and
- instructions to identify, responsive to the determination and based on the table, a file in the plurality of chained files containing the current version of the data.

11. The computer readable media of claim 10 further comprising instructions to update an entry in the table by associating a file in the plurality of chained files with a virtual hard drive address when a new file is added to the plurality of chained files.

12. The computer readable media of claim 10 further comprising instructions to maintain a table associating each of a plurality of virtual hard drive addresses to a master file or a file in the plurality of chained files containing a current version of data at that address, and associating each of a second plurality of virtual hard drive addresses to at least one file that is not a master file or a file in the plurality of chained files.

* * * * *